(12) United States Patent
McGuire et al.

(10) Patent No.: US 9,106,815 B1
(45) Date of Patent: Aug. 11, 2015

(54) IMAGE ACQUISITION SYSTEM FOR CAPTURING IMAGES OF OBJECTS AUTOMATICALLY CONVEYED VIA TRANSPORT MECHANISM

(71) Applicant: Amazon Technologies, Inc., Reno, NV (US)

(72) Inventors: Jonathan G. McGuire, Seattle, WA (US); Jeremy David Sawatzky, Seattle, WA (US); Jules Cook Graybill, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 77 days.

(21) Appl. No.: 13/913,087

(22) Filed: Jun. 7, 2013

Related U.S. Application Data (63) Continuation of application No. 12/712,998, filed on Feb. 25, 2010, now Pat. No. 8,462,206.

(51) Int. Cl.
| | |
|---|---|
| *H04N 5/225* | (2006.01) |
| *H04N 7/18* | (2006.01) |
| *G03B 15/00* | (2006.01) |
| *G03B 17/48* | (2006.01) |
| *G03B 19/00* | (2006.01) |
| *G03B 29/00* | (2006.01) |
| *A61B 6/00* | (2006.01) |
| *G01N 23/00* | (2006.01) |

(Continued)

(52) U.S. Cl.
CPC .................. *H04N 5/2251* (2013.01)

(58) Field of Classification Search
CPC ....... F16M 11/18; F16M 11/08; G03B 15/06; G03B 15/00; G03B 19/023; G06T 7/0004; G06T 2200/08; G06T 2207/10116; G06T 2207/20092; G06T 2207/20144; G06T 2207/30004; G06T 7/0024
USPC ................... 348/143, 125, 127, 135, 139, 77, 348/86–95, 373; 382/141–152, 154, 110; 378/20, 208; 396/428, 1–5, 429
See application file for complete search history.

(56) References Cited

U.S. PATENT DOCUMENTS

| | | |
|---|---|---|
| 2,140,602 A | 12/1938 | Simjian |
| 4,172,524 A | 10/1979 | Holm et al. |

(Continued)

OTHER PUBLICATIONS http://www.lobsterpotphoto.co.uk/, Lobsterpot product page, as of Febuary 14, 2010, pp. 1-3.

(Continued)

*Primary Examiner* — Chia-Wei A Chen
(74) *Attorney, Agent, or Firm* — Robert C. Kowert; Meyertons, Hood, Kivlin, Kowert & Goetzel, P.C.

(57) ABSTRACT

A system for acquiring images includes a photographing machine. The photographing machine includes a base, a carrier coupled to the base, a camera coupled to the carrier, a camera positioning system, and a background panel coupled to the carrier. The camera can take photographs of an object when the object is in a target zone. The camera positioning system moves the carrier to position the camera and to point the camera at the target zone. When the carrier is moved to position the camera, at least a portion of the background panel moves such that at least a portion of the background panel maintains a position opposite the camera relative to the target zone.

20 Claims, 9 Drawing Sheets

(51) Int. Cl.
 *G21K 1/12* (2006.01)
 *H05G 1/60* (2006.01)

(56) References Cited

U.S. PATENT DOCUMENTS

| | | | |
|---|---|---|---|
| 4,236,795 A * | 12/1980 | Kephart | 396/5 |
| 4,736,218 A | 4/1988 | Kutman | |
| 5,119,190 A | 6/1992 | Lemelson | |
| 5,177,645 A | 1/1993 | Lemelson | |
| 5,249,045 A | 9/1993 | Lemelson | |
| 5,283,641 A * | 2/1994 | Lemelson | 348/92 |
| 5,289,218 A | 2/1994 | Pippin | |
| 5,852,672 A | 12/1998 | Lu | |
| 5,878,868 A | 3/1999 | Gotoh et al. | |
| 6,069,565 A | 5/2000 | Stern et al. | |
| 6,343,184 B1 | 1/2002 | Huebner | |
| 6,346,982 B1 * | 2/2002 | Yasuda et al. | 356/237.1 |
| 6,959,068 B1 * | 10/2005 | Sommer | 378/20 |
| 7,151,816 B2 * | 12/2006 | Maier et al. | 378/20 |
| 7,406,257 B2 * | 7/2008 | Yi et al. | 396/5 |
| 7,440,685 B2 * | 10/2008 | Weng | 396/5 |
| 7,807,981 B2 * | 10/2010 | Frach et al. | 250/492.1 |
| 2003/0206735 A1 * | 11/2003 | Saigo et al. | 396/1 |
| 2004/0047624 A1 | 3/2004 | Sugiura et al. | |
| 2006/0147188 A1 * | 7/2006 | Weng | 396/5 |
| 2006/0232583 A1 * | 10/2006 | Petrov et al. | 345/419 |
| 2007/0003021 A1 * | 1/2007 | Guertin et al. | 378/208 |
| 2007/0252900 A1 * | 11/2007 | Iwaki et al. | 348/222.1 |
| 2008/0056569 A1 * | 3/2008 | Williams et al. | 382/173 |
| 2008/0170658 A1 * | 7/2008 | Pack et al. | 378/20 |
| 2010/0329425 A1 * | 12/2010 | Guo et al. | 378/91 |
| 2011/0069880 A1 * | 3/2011 | Sergieiev | 382/154 |

OTHER PUBLICATIONS http://www.kaidan.com/products/mc60.html, Kaidan Meridian C-60 product order page, Kaidan Incorporated 2001, pp. 1-3.
http://www.kaidan.com/products/tm400.htnnl, Kaidan Meridian TM-400 product order page, Kaidan Incorporated 2001, pp. 1-3.

* cited by examiner

IMAGE ACQUISITION SYSTEM FOR CAPTURING IMAGES OF OBJECTS AUTOMATICALLY CONVEYED VIA TRANSPORT MECHANISM

This application is a continuation of U.S. patent application Ser. No. 12/712,998, filed Feb. 25, 2010, which is incorporated by reference herein in its entirety.

BACKGROUND

Consumers who purchase products online or by mail-order often desire to see photographs of a product before purchasing the product. For many personal articles, such as apparel or footwear, the appearance of an article may be a very important consideration in whether or not to purchase the article. In the case of shoes, for example, a customer may wish to see how the shoes look from the sides, the top, and several other directions. One retailer may offer hundreds or even thousands of different articles. Moreover, a retailer's offerings for some types of consumer products may be in a continual state of change, with new items being added continually. For such retailers, acquiring and processing all of the images of interest to its customers may be labor-intensive and expensive.

Some online retailers employ a photographer, or even several photographers, to take photographs of specimens of articles to be offered for sale. Setting up, photographing, and post-image acquisition processing of the needed images, as well as the associated handling and tracking of the specimens themselves, is likely to require substantial staff, studio facilities, and other resources. In addition, the photographs taken are likely to vary from photographer to photographer, and, even with the same photographer, from photo shoot to photo shoot and from shot to shot, due to a myriad of variations in object placement, lighting, background, camera position, camera setting choices, etc. With many imaging systems, when a camera is moved from one position to another to capture different views of an object, the background will change from view to view, as different features of the imaging apparatus (such as rails, platforms, or positioning mechanisms), and/or objects behind the apparatus, appear in the background. Some inconsistencies, anomalies, and other undesired features introduced during a photo shoot can be removed or at least mitigated by post-image acquisition processing techniques. For example, an image may be touched up to remove the edge of a platform. Such post-processing techniques may, however, be expensive and time-consuming to employ, and even when employed may not ultimately achieve the level of article-to-article consistency that is sought by the retailer.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION OF EMBODIMENTS

Various embodiments of systems and methods for acquiring images of an object from multiple directions are disclosed. According to one embodiment, a system for acquiring images of objects includes a photographing machine. The photographing machine includes a base, a carrier coupled to the base, a camera, a background panel, and a camera positioning system. The camera and the background panel are both coupled to the carrier. The camera can take photographs of an object when the object is in a target zone. The camera positioning system moves the carrier to position the camera and to point the camera at the target zone. When the carrier is moved to position the camera, at least a portion of the background panel moves such that at least a portion of the background panel maintains a position opposite the camera relative to the target zone.

According to one embodiment, a system for acquiring images of objects from multiple directions includes a photographing machine and at least one platter to support objects to be imaged. The photographing machine includes a base, a carrier coupled to the base, a camera coupled to the carrier, a camera positioning system, and a platter drive system. The camera positioning system moves the carrier to position the camera and to point the camera at a target zone. The platter drive system can support and rotate a platter when the platter is coupled to the platter drive system.

According to one embodiment, a system for acquiring images of objects from multiple directions includes a photographing machine, at least one platter for objects to be imaged, and a platter delivery system. The photographing machine includes a base, a carrier coupled to the base, a camera coupled to the carrier, and a camera positioning system. The camera positioning system moves the carrier to position the camera and to point the camera at a target zone. The platter delivery system delivers the platters to the target zone.

According to one embodiment, a method of acquiring images of an object from two or more directions includes providing a camera on a carrier. The carrier points the camera at a target zone. Identification information is collected for an object to be imaged. The object to be imaged is delivered into the target zone. Based on the identification information, a sequence of images to be taken of the object is retrieved. The sequence of images of the object is automatically shot by moving the carrier such that the camera is in at least two different positions relative to the target zone. In some embodiments, a background panel automatically moves in opposition to a camera such that the background appears in all the images acquired during a sequence. Images acquired using a background that moves in opposition to a camera may result in images having a clean background that need little or no retouching before use. In certain embodiments, one or more images in a sequence may be displayed (such as to an online purchaser of an item) without retouching, or with only auto-cropping of the images.

As used herein, "camera" means any device that can acquire or capture an image of an object.

As used herein, "carrier" means any element or combination of elements that carries, supports, or positions one or more other elements. A carrier may carry elements in a fixed relationship to one another, for relative motion with respect to one another, or a combination of both. As an example of carried elements in a fixed relationship, a camera and a background panel may both be rigidly attached to a carrier. As an example of a carrier that allows relative motion, a carrier may include a first arm that can position a camera relative to a fixed base of the carrier, and a second arm that can separately position a background panel relative to the fixed base of the carrier.

As used herein, "platter" means any element that can physically support an object while the object is photographed. A platter may be, for example, a plate, a disc, a block, a grid, a sheet, a box, or a tray. A platter may be round, square, or another shape. In certain embodiments, a platter may have raised sides or a top, such as a box having transparent sidewalls.

As used herein, "platter drive system" means any device or combination of devices that can rotate, translate, or otherwise move a platter. As one example, a platter drive system may include a motor-driven turntable disc. As another example, a platter drive system may include a set of rollers that can be driven to rotate a platter in a horizontal plane about a vertical axis.

As used herein, a "panel" may be flat, arcuate, curved, concave, convex, irregular, a combination thereof.

As used herein, "base" includes any element or combination of elements that holds or supports another element or elements.

As used herein, "drive system" means any system that can move, rotate, translate, or position an element or combination of elements. A drive system may include one or more of any of various drive elements, such as rollers, wheels, rods, pulleys, gears, belts, or sprockets.

As used herein, "opposed", or "opposite", in the context of the relationship between a camera and another element (such as a background panel) relative to a target zone, means that the element is positioned such that the camera images at least a portion of the element when a shot is taken while the camera is pointed at the target zone. For example, a background panel may be opposed to a camera if at least a portion of the background panel is below the target zone when the camera is directly above the target zone and pointed straight down toward the target zone.

As used herein, "coupled to" includes a direct connection or an indirect connection. Elements may be coupled to one another in any of various manners, including a fixed connection, pivoting connection, sliding connections, or combinations thereof.

Figure 1:
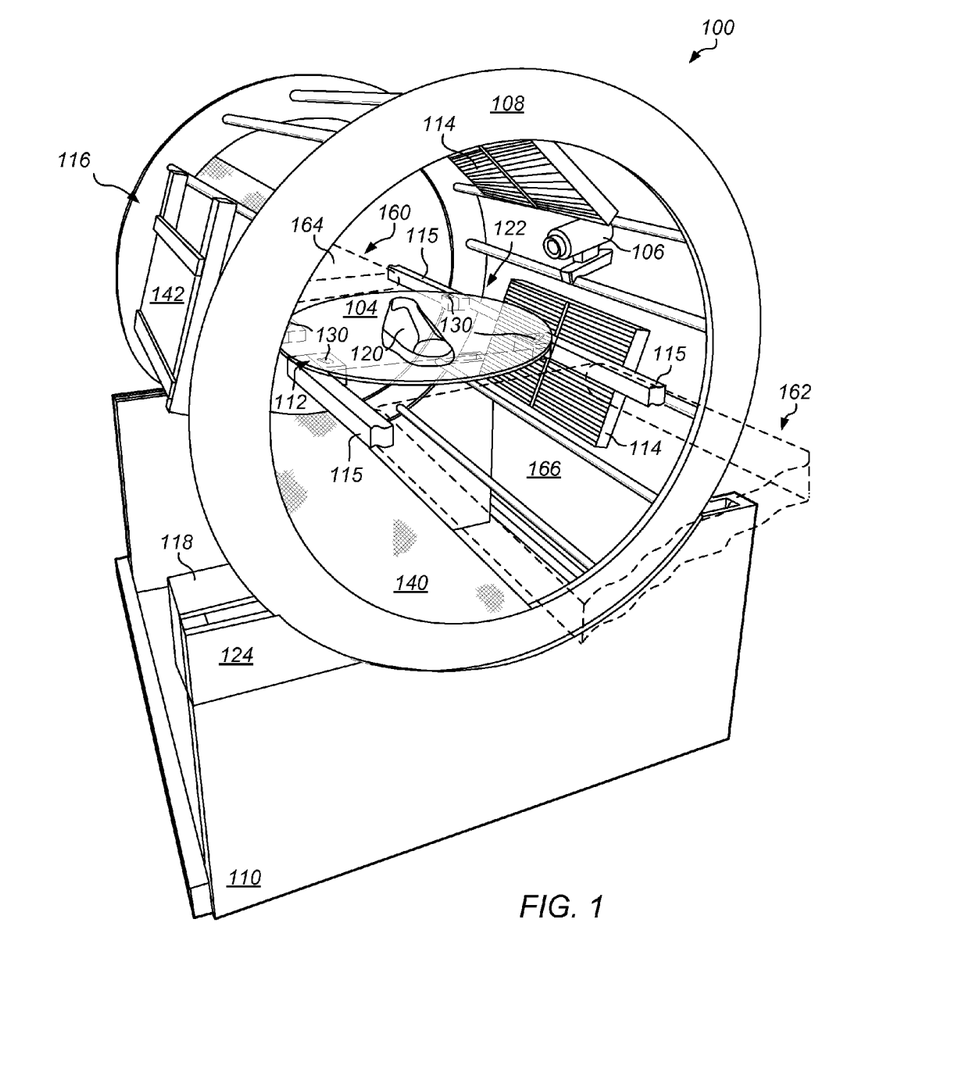
FIG. 1 illustrates a system for acquiring images of an object from multiple directions.

FIG. 1 illustrates a system for acquiring images of an object from multiple directions according to one embodiment. Image acquisition system 100 includes photographing machine 102 and one or more platters 104. Photographing machine 102 includes camera 106, carrier 108, base 110, platter drive system 112, main lights 114, background system 116, and control system 118. Camera 106, main lights 114, and background system 116 are mounted on carrier 108. Carrier 108 is mounted on base 110. During operation, an object to be photographed, such as object 120 shown in FIG. 1, is placed on one of platters 104. Platter 104 is placed on platter drive system 112 of photographing machine 102 so that object 120 is in target zone 122. Carrier 108 may be operated to position and point camera 106 at object 120 in target zone 122. Camera 106 may be operated to capture images of object 120.

Base 110 includes carrier drive system 124. Carrier drive system 124 may be operated to rotate carrier 108 on base 110 about a central axis of the carrier. As illustrated in FIG. 1, carrier drive system 124 may drive carrier 108 in a "squirrel cage" arrangement. Carrier drive system 124 may include, for example, a belt-drive wheel or gear that causes carrier 108 to rotate on base 110. A drive wheel for the carrier may be driven, for example, by a stepper motor, such that carrier 108 may be positioned at various desired angles (0, 45, 90, 135, 180 degrees). By rotating carrier 108, the position and direction of camera 106 relative to target zone 122 can be controlled. In the embodiment shown in FIG. 1, camera 106 points toward target zone regardless of the angle rotation of carrier 108. In one embodiment, camera 106 can be positioned at any angle between 6 o'clock (directly below the target zone) and 12 o'clock (directly above the target zone).

Platter drive system 112 includes platter drive wheels 130. Platter drive wheels 130 may be mounted on support arms 115. Support arms 115 may be tied to base 110 or tied to another structure outside the interior cylindrical space of carrier 108. The structure to which support arms 115 are coupled may be fixed relative to base 110. In alternate embodiments, a platter drive system may be carried, along with a platter, on a conveyor or a rail system.

Platter drive wheels 130 cooperate with one another to support platter 104 in target zone 122. In one embodiment, platter drive system 112 includes stepper motors to drive platter drive wheels 130. Platter drive system 112 may be operated in a coordinated manner, as a turntable, to drive platter drive wheels 130 to turn platter 104. By selectively rotating platter 104, object 120 may be rotated in a horizontal plane such that any of the various surfaces of object 120 (front, back, side) face a desired horizontal direction.

In some embodiments, a carrier drive system and a platter drive system are synchronized with one another to operate as a camera positioning system. In the embodiment illustrated in FIG. 1, for example, carrier drive system 124 may be operated to control an angle of altitude of camera 106 relative to object 120. For example, camera 106 may be positioned directly above object 120, directly below object 120, or at an intermediate angle. Platter drive system 112 may be operated to control an angle of azimuth of object 120 relative to camera 106. Thus, even though camera 106 remains fixed in a plane perpendicular to the central axis of carrier 108 as carrier 108 rotates about the central axis, by rotating platter 104 on platter drive system 112, the camera can be pointed toward any surface of object 120.

Control unit 118 may be coupled to camera 106, platter drive system 112, and carrier drive system 124. Control unit 118 may be programmed to control any or all of camera 106, platter drive system 112, and carrier drive system 124. Control unit 118 may also be connected to computer systems, scanners, servers, or platter transport systems. In certain embodiments, control unit 118 includes a user control panel.

Figure 2:
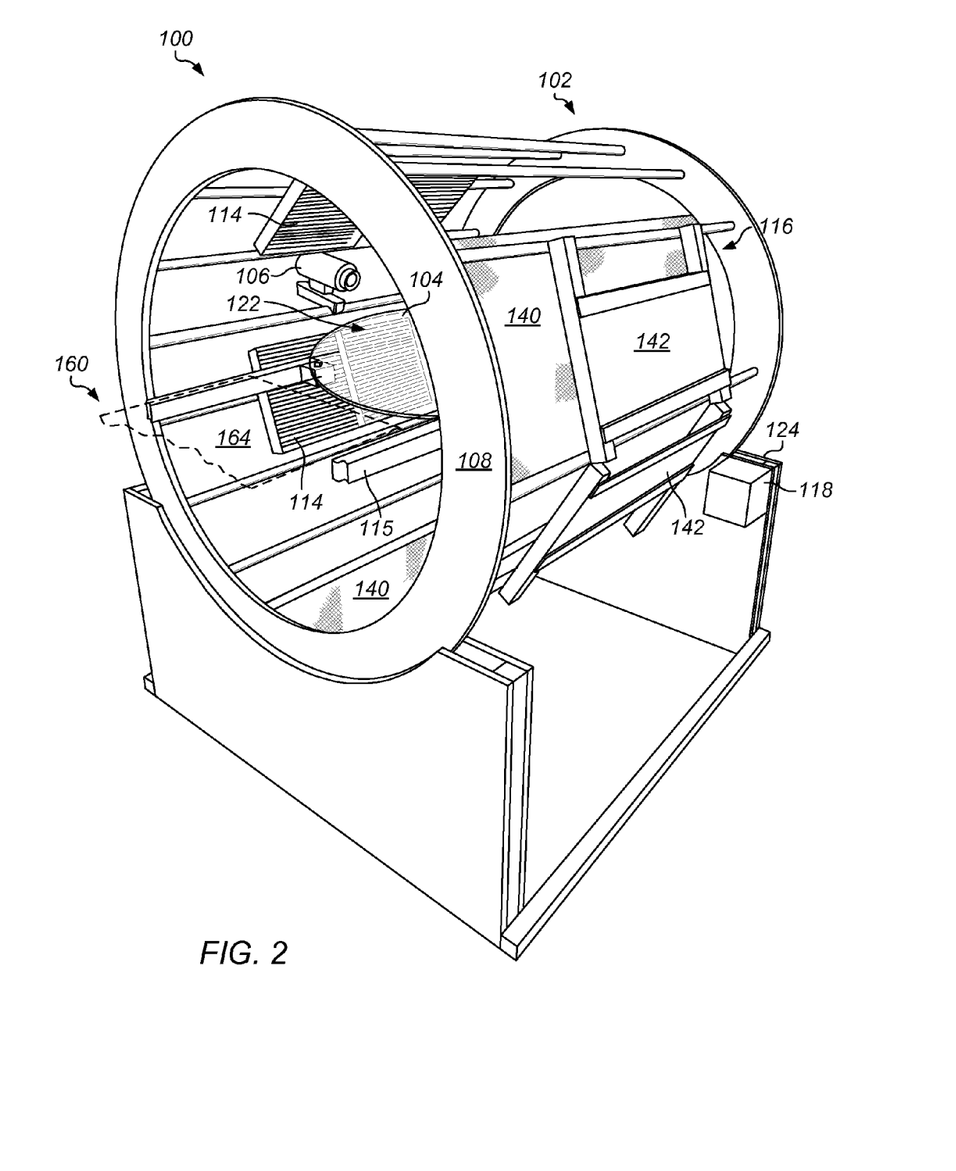
FIG. 2 illustrates, from a reverse angle, the system for acquiring images of an object from multiple directions shown in FIG. 1.

FIG. 2 illustrates image acquisition system 100 from a reverse angle according to one embodiment. Background system 116 is mounted to carrier 108. Background system 116 includes background panel 140 and background lights 142. Background panel 140 is mounted on carrier 108 opposite camera 106, along the circumference of carrier 108.

Background lights 142 are positioned behind background panel 140 and directed toward the rear surface of background panel 140. Background panel 140 may serve as a diffuser to diffuse light from background lights 142 into target zone 122. In one embodiment, background panel 140 is made of a frosted acrylic glass. In another embodiment, background panel 140 includes a clear acrylic glass base panel with a vellum covering. Background lights 142 may be spaced a few inches behind background panel 140. Having a space between background panel 140 and background lights 142 may produce a relatively even light in the background of product images.

In the embodiment illustrated in FIG. 2, background panel 140 has an arcuate shape that matches the cylindrical shape of carrier 108. Background panel may have a radius of curvature that is centered on the central axis of the carrier. A background panel may, however, have any of various curvatures and forms, including flat, spherical, convex, concave, irregular, or combinations thereof.

Background panel 140 extends in an arc around a portion of the circumference of carrier 108. In the embodiment illustrated in FIG. 2, background panel 140 extends in an arc of about 120 degrees. In other embodiments, however, background panel 140 may extend in a smaller arc or a larger arc. In one embodiment, background panel 140 extends around 70% of the circumference of carrier 108.

Main lights 114 and background lights 142 may be any of various suitable light-producing devices. In one embodiment, main lights 114 and background lights 142 are arrays of light emitting diodes. Main lights 114 and background lights 142 may emit light in any color. In one embodiment, background lights 142 emit white light having RGB coordinates of 255/255/255. In another embodiment, background lights 142 may be a gray light. In certain embodiments, the color of main lights 114 and/or background lights 142 may be varied (for example, by or through control unit 118). For example, background lights 142 may be automatically adjusted from a white light to a green light. In certain embodiments, the intensity of main lights 114 and/or background lights 142 may be varied (for example, by or through control unit 118).

In certain embodiments, a background panel may not be backlit at all. In certain embodiments, a background panel may be opaque.

In some embodiments, one or more settings on camera 106 are automatically controlled. For example, shutter speed, zoom, aperture, may be automatically adjusted. Control signals may be transmitted to a camera and/or other systems in the photographing machine by way of wired signals (such as by USB) or wireless signals (such as by wi-fi). In some embodiments, a camera includes an automatically controlled zoom lens.

In some embodiments, an image acquisition machine automatically shoots a sequence of two or more images of an object from different directions. In some embodiments, a background panel automatically moves to remain opposite the camera for two or more shots in the sequence. In this manner, a relatively consistent background can be maintained for the some or all of the shots in the sequence.

Figure 3A:
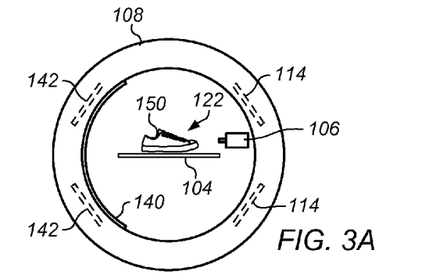
FIGS. 3A-3G illustrate sequentially capturing photographs of different views of a shoe with an image acquisition system.

FIGS. 3A-3G illustrate sequentially capturing photographs of different views of a shoe according to one embodiment. FIG. 3A shows a photographing machine set to capture a front view of a shoe. Carrier 108 is rotated so that camera 106 is approximately level with shoe 150. As carrier 108 rotates, background panel 140 and background lights 142 remain opposite camera 106 relative to shoe 150. Platter drive system 112 (shown in FIG. 1, but omitted from FIGS. 3A-3G for clarity) is operated to turn platter 104 such that the front of shoe 150 faces camera 106.

Figure 3B:
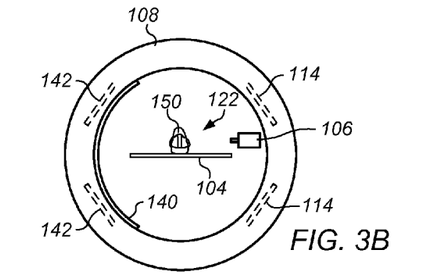

In FIG. 3B, photographing machine 102 is set to capture an image of the outside of shoe 150. Platter drive system 112 is operated to turn platter 104 such that the outer side of shoe 150 faces camera 106. During shooting of the outer side, carrier 108, camera 106, and background panel 140 may remain in the same position as in FIG. 3A.

Figure 3C:
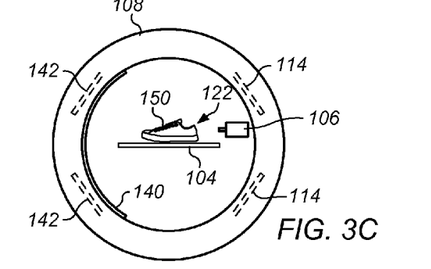

In FIG. 3C, photographing machine 102 is set to capture an image of the back side of shoe 150. Platter drive system 112 is operated to turn platter 104 such that the back side of shoe 150 faces camera 106. During shooting of the back side, carrier 108, camera 106, and background panel 140 may remain in the same position as in FIG. 3B.

Figure 3D:
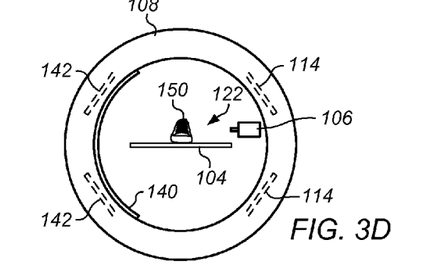

In FIG. 3D, photographing machine 102 is set to capture an image of the inner side of shoe 150. Platter drive system 112 is operated to turn platter 104 such that the inner side of shoe 150 faces camera 106. During shooting of the inner side, carrier 108, camera 106, and background panel 140 may remain in the same position as in FIG. 3C.

Figure 3E:
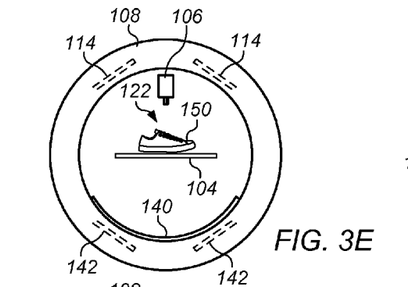

In FIG. 3E, photographing machine 102 is set to capture an image of the top of shoe 150. Platter drive system 112 may be operated to turn platter 104 such that the shoe 150 is in a desired orientation. Carrier 108 is rotated so that camera 106 is above shoe 150 and aimed downward at shoe 150. As carrier 108 rotates, background panel 140 remains opposite camera 106 relative to shoe 150. Thus, as camera 106 moves above shoe 150, background panel 140 and background lights 142 move to a position below platter 104 and shoe 150. In this embodiment, platter 104 may be transparent such that camera 106 captures an image of background panel 140 through platter 104.

Figure 3F:
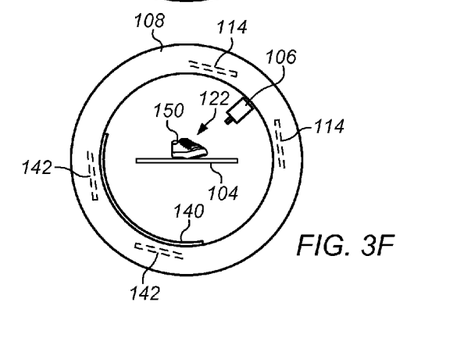

In FIG. 3F, photographing machine 102 is set to capture an image of the upper outside front of shoe 150. Platter drive system 112 may be operated to turn platter 104 such that the upper outside front of shoe 150 faces camera 106. Carrier 108 is rotated so that camera 106 is between 0 and 90 degrees above horizontal (for example, about 45 degrees above horizontal) and aimed at shoe 150. As carrier 108 rotates, background panel 140 again remains opposite camera 106 relative to shoe 150. As discussed above with respect to FIG. 3E, platter 104 may be transparent in this embodiment, and thus camera 106 may capture an image of background panel 140 through platter 104.

Figure 3G:
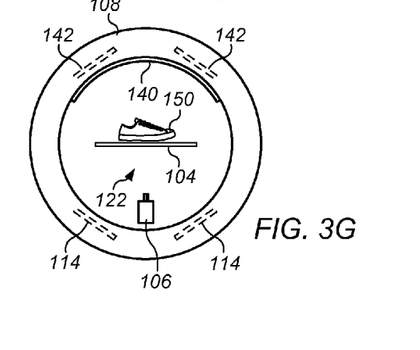

In FIG. 3G, photographing machine 102 is set to capture an image of the bottom of shoe 150. Platter drive system 112 may be operated to turn platter 104 such that shoe 150 is in a desired orientation. Carrier 108 is rotated so that camera 106 is below shoe 150 and aimed upward at shoe 150. As carrier 108 rotates, background panel 140 again remains opposite camera 106 relative to shoe 150. As discussed above with respect to FIG. 3E, platter 104 may be transparent in this embodiment, and thus camera 106 may capture an image of shoe 150 and background panel 140 through platter 104.

During imaging at all of the positions shown in FIGS. 3A-3G, background panel 140 and background lights 142 may remain opposite camera 106 relative to shoe 150. A background system that moves in opposition to a camera, such as background panel 140 and background lights 142, may produce a background for a sequence of images that is relatively consistent from image to image. For example, in one embodiment, background panel 140 and background lights 142 produce a solid white background in all of the views of shoe 150. In addition, a background system that moves in opposition to a camera may produce a background for images that may be ready for use without retouching or with minimal retouching. In some embodiments, at least some of the lights for a photographing machine (such as photographing machine 102) have a fixed relationship to the background and the camera.

During imaging at all of the positions shown in FIGS. 3A-3G, camera 106 may remain at approximately the same distance from shoe 150. As a result, the size of shoe 150 may be relatively consistent in all of the images of shoe 150. A consistent image size of an object, such as shoe 150, may reduce or eliminate a need to post-acquisition processing for a set of images.

In some embodiments, an object to be photographed may be automatically transported to and/or from a target zone. In some embodiments, object is transported on a platter. The platter may serve as a carrier for the object as the object moves through an image acquisition system. Suitable mechanisms for transporting an object on a platter may include conveyor belt systems, robotic arms, motorized carts, and/or combinations thereof. In some embodiments, an object to be photographed may be automatically transferred to or from conveyor belt onto a turntable by a transfer mechanism. In one embodiment, the transfer mechanism is a robotic arm that transports a platter carrying the object to the turntable system.

In the embodiment illustrated in FIG. 1, image acquisition system 100 includes platter delivery system 160 and platter removal system 162. Platter delivery system 160 includes delivery conveyor belt 164. Platter removal system 162 includes removal conveyor belt 166. Platter delivery system 160 may carry platter 104 to platter drive system 112, such that object 120 is positioned in target zone 122. After object 120 is photographed using photographing machine 102, platter removal system 162 may carry platter 104 away from platter drive system 112, such that object 120 moves out of target zone 122. In some embodiments, platter delivery system 160 and platter removal system 162 are coupled to, and controlled by, control unit 118.

Figure 4:
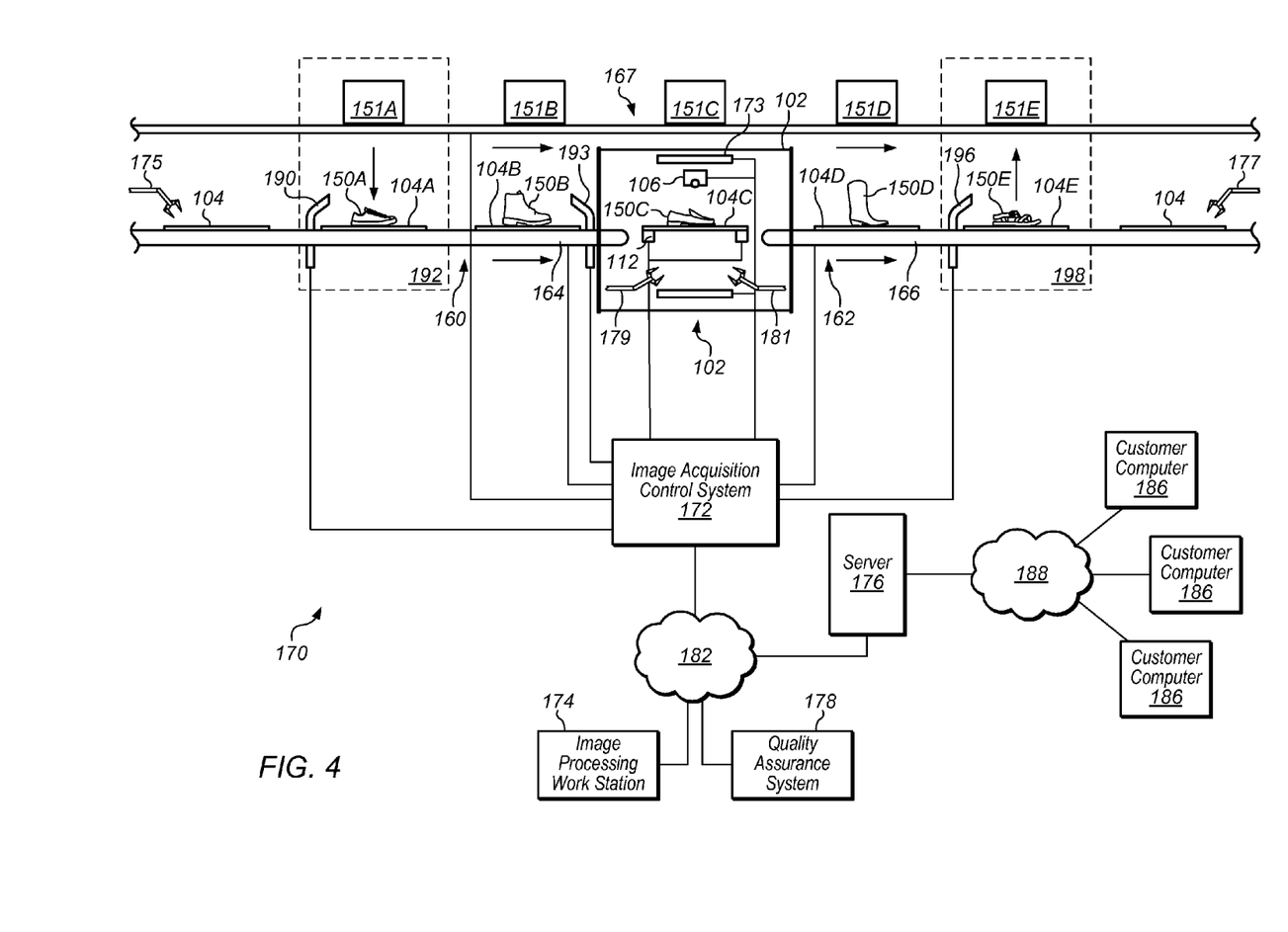
FIG. 4 illustrates an embodiment of an electronic commerce system that includes an automatic image acquisition system.

In some embodiments, an image acquisition system is integrated with other systems for carrying out product sales. FIG. 4 illustrates an embodiment of an electronic commerce system that includes an automatic image acquisition system. Electronic commerce system 170 includes image acquisition control system 172 and photographing machine 102. Image acquisition control system 172 may control imaging operations and workflow of objects to and from photographing machine 102. In particular, image acquisition control system 172 may control camera 106, lights 173, and platter drive system 112 of photographing machine 102. Image acquisition control system 170 may also control platter delivery system 160, platter removal system 162, packaging conveyor system 167, platter loading arm 175, platter takeoff arm 177, and platter transfer arms 179 and 181.

Image acquisition control system 172 is coupled to image processing workstation 174, retail server 176, and quality assurance system 178 over network 182. Retail server 176 may serve customers operating customer computers 186 over network 188. In one embodiment, network 188 is the Internet.

At image processing workstation 174, imaging operations in photographing machine 102 may be set up or conducted. Image processing workstation 174 may also be used for post-processing such as cropping and line removal for images acquired with photographing machine 102. Processed images may be screened in quality assurance system 178, then uploaded to retail server 176 for use by customers in evaluating products for purchase from the seller.

As illustrated in FIG. 4, objects to be photographed may be transported on platters to and from a photographing machine in a sequential manner. In FIG. 4, each of shoes 150A-150E is at a different stage of progress in the image acquisition process.

Platter loading arm 175 may place empty platters, one at a time, on platter delivery conveyor belt 164. Platters 104 may advance on platter delivery conveyor belt 164 toward photographing machine 102.

At imaging prep station 192, shoe 150A may be removed from package 151A, prepared for imaging, and placed on platter 104A. Prep station scanner 190 may be used to scan identification data for shoe 150A, such as a bar code, from package 151A. The bar code may be associated with product identifier for the shoe, such as a SKU number. Prep station scanner 190 may also scan an identification code on platter 104A for identification of platter 104A. Image acquisition control system 172 may receive identification code data from prep station scanner 190, and associate the identification code for shoe 150A with the identification code for platter 104A. In this manner, the identification code for platter 104A can be used to locate shoe 150A as it advances through the image acquisition system.

As shoe 150A advances on platter delivery conveyor belt 164, package 151A may advance on packaging conveyor system 167. Package 151A may advance at the same rate as shoe 150A, or at a different rate.

Shoe 150B on platter 104B has advanced on platter delivery conveyor 164 to a position near the front edge of photographing machine 102. Pre-imaging identification scanner 193 may scan the identification code on platter 104B. The identification code on platter 104B may have been previously scanned at imaging prep station 192 and associated with an identification code for shoe 150B. Based on this association, image acquisition control system 172 can use the identification code on platter 104B read by pre-imaging identification scanner 193 to identify that shoe 150B is the object next in line to enter photographing machine 102, and choose an appropriate shooting algorithm for imaging of shoe 150B.

Shoe 150C on platter 104C has advanced to a position on platter drive system 112 in photographing machine 102. In some embodiments, platter 104C is transferred to platter drive system 112 using robotic arm 179. A suitable imaging algorithm may be selected for shoe 150C, and a sequence of images of shoe 150C may be acquired automatically, in a manner such as described above with respect to FIGS. 3A-3G.

Shoe 150D on platter 104D has advanced out of photographing machine 102 to a position on platter removal conveyor 166. In some embodiments, platter 104D may be transferred from platter drive system 112 to platter removal conveyor 166 using robotic arm 181.

Shoe 150E on platter 104E has advanced to repackaging station 198. Repackaging station scanner 196 may be used to scan a bar code on platter 104E and a bar code on package 151E. If an association was made between the bar code on package 151E and the bar code on platter 104E when shoe 150E was unpacked and placed at image prep station 192, this association may now be used to verify that package 151E is the proper package for shoe 150E. After verification, shoe 150E may be repackaged in package 151E.

As shoes 150A, 150B, 150C, 150D, and 150E advance through the image acquisition system, their respective packages 151A, 151B, 151C, 151D, and 151E may advance on packaging conveyor system 167. In some embodiments, image acquisition control system 172 synchronizes packaging conveyor system 167, photographing machine 102, platter delivery conveyor 164, and platter removal conveyor 166 such that the packaging for an object arrives at repackaging station 198 at about the same time as the object itself. For example, package 151E may arrive at repackaging station 198 at the same time as shoe 150E.

Figure 5A:
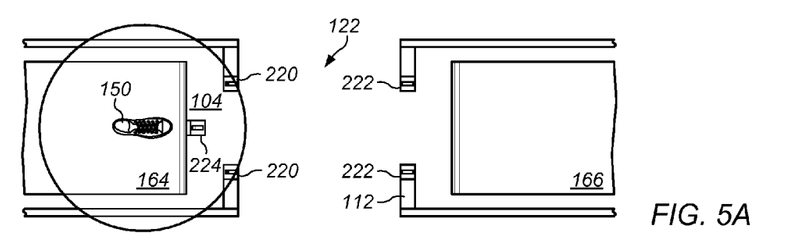
FIGS. 5A-5F illustrate automatic transportation of an object into and out of a target zone of a photographing machine.
Figure 5B:
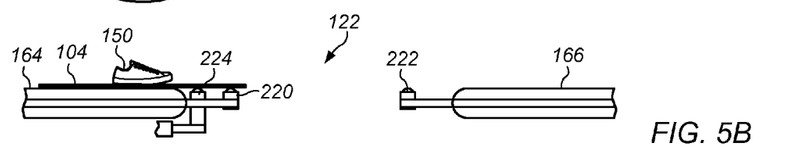
Figure 5C:
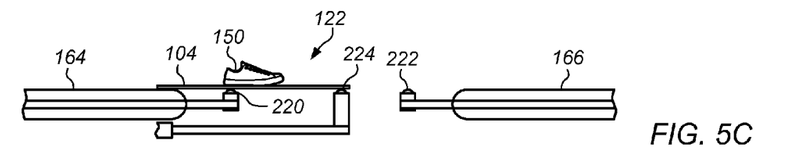

FIGS. 5A-5F illustrate automatic transportation of an object into and out of a target zone of a photographing machine according to one embodiment. FIGS. 5A and 5B illustrate top and side views, respectively, of shoe 150 on platter 104 as the platter is carried on delivery conveyor belt 164 into photographing machine 102. During transfer of platter 104 onto platter drive system 112, first platter drive wheels 220 and second platter drive wheels 222 may be oriented along the direction of travel of delivery conveyor belt 164, as shown in FIG. 5B. First platter drive wheels 220 may be driven to advance platter 104 into target zone 122, as shown in FIG. 5C. As platter 104 is advanced across the gap between first platter drive wheels 220 and second platter drive wheels 222, bridge roller 224 may be extended to support platter 104. First platter drive wheels 170 may be operated until the leading portion of platter 104 reaches second platter drive wheels 222.

Figure 5D:
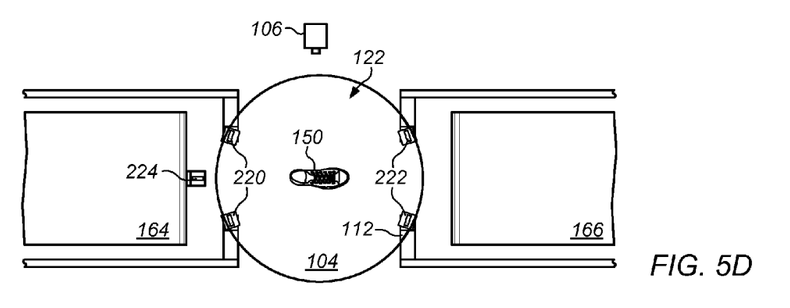
Figure 5E:
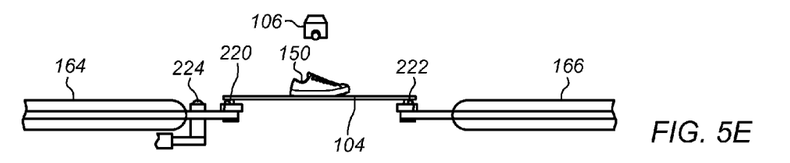

FIGS. 5D and 5E illustrate top and side views, respectively, of platter 104 in a fully installed position in target zone 122 on platter drive system 112. With platter 104 fully installed on platter drive system 112, first platter drive wheels 220 and second platter drive wheels 222 may be re-oriented into a tangential direction relative to platter 104 so that platter drive system 112 can serve as a turntable for platter 104. At this point, platter drive system 112 may be operated to turn platter 104 to image shoe 150 from multiple directions, as described above with respect to FIGS. 3A-3G. During imaging of shoe 150, bridge roller 224 is retracted out of target zone 122, as shown in FIGS. 5D and 5E, so that bridge roller 224 does not appear in the images of shoe 150.

Figure 5F:
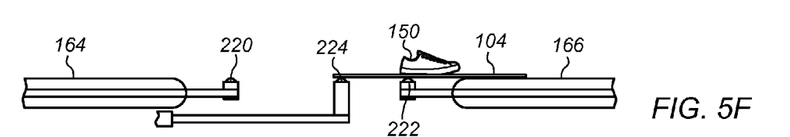

FIG. 5F illustrates removal of platter 104 after imaging. During removal of platter 104 from platter drive system 112, first platter drive wheels 220 and second platter drive wheels 222 may reoriented in the direction of travel along removal conveyor belt 166, as shown and described above relative to FIGS. 5A and 5B. Second platter drive rollers 222 may be operated to advance platter 104 onto removal conveyor belt 166. Removal conveyor belt 166 may carry shoe 150 on platter 104 out of photographing machine 102.

Figure 6:
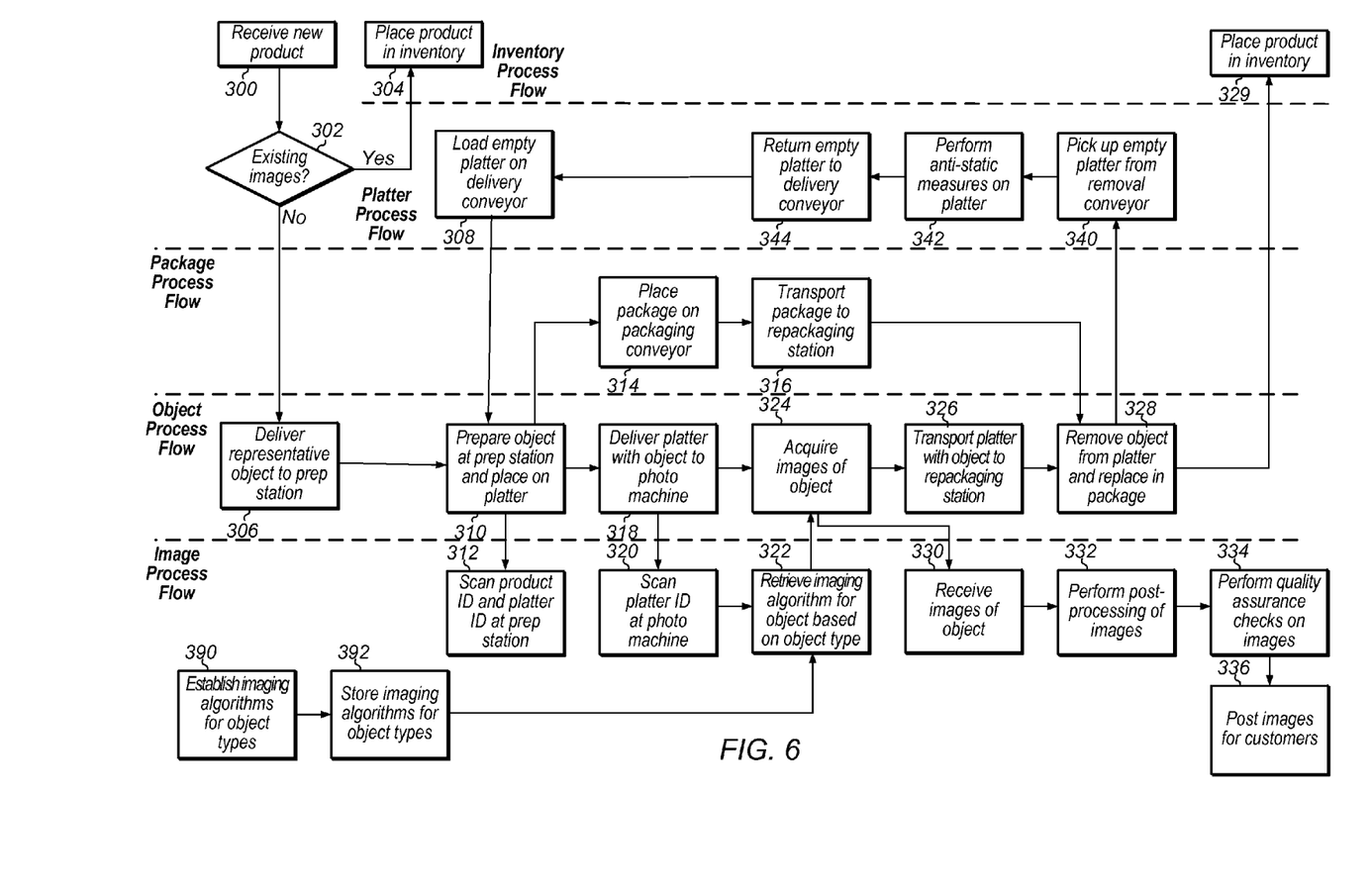
FIG. 6 illustrates automated acquisition, processing, and use of images for use in selling products.

FIG. 6 illustrates automated acquisition, processing, and use of images of products for selling the products according to one embodiment. Any or all of the steps may be performed automatically (by control unit 118, for example), manually, or a combination thereof. Although the workflows in FIG. 6 are described for a single product, the processing may in some embodiments be performed for multiple products in serial fashion (one product after another in a continuous or batch process, for example), multiple products in parallel fashion (with two or more image acquisition systems operating simultaneously, for example), or both.

At 290, an imaging algorithm may be established for each of one or more object types or classes. The imaging algorithm for an object type or class may be based on the type of product (shoe, purse, hat, music player, etc.), characteristics of the object's appearance (such as color, gloss, or size), sales parameters (such as a sales channel for the product, or whether the product is a discount item), or on any of various other characteristics. The imaging algorithm may specify attributes of an imaging sequence, including the number and direction of each of shot, main light settings, background light settings, background color settings, camera settings, background, and various other aspects of the imaging process. Each type or class of object may have different imaging algorithm. For example, the imaging algorithm for a dress shoe may call for images from seven specified directions (top, front, back, side, etc.) with certain lighting and zoom settings, the imaging algorithm for a plate of china may call for a single image taken from directly above the plate, with different lighting and zoom settings, and so on. In some embodiments, product identifiers, such as a bar code, are stored in association with the object types. For example, the bar code for a particular boot may be associated with object type=boot/ black/shiny.

At 292, the established imaging algorithms may be stored, for example, in a computer database, for subsequent retrieval and use during image acquisition.

At 300, a product to be sold may be received by a seller. The seller may be, in one example, an electronic commerce retailer. At 302, a determination is made of whether the seller already has images of the product available. If the seller already has images of the product available, the received products may be placed into the seller's inventory at 304. If the seller does not already have images of the product, a representative object for the product may be delivered (typically, in the package for the product, if any) to an imaging prep station at 306. For products that include two or more items (such as a pair of shoes, a box of nails), the representative object may be a representative item. For example, the representative object for a pair of shoes may be the right shoe of the pair. For a set of china, a representative item may be one plate in the set of china. A representative object may also be an item of a product that is the most aesthetically significant item. For example, for an electric guitar/amplifier set, the representative object may be the guitar.

At 308, one or more empty platters are loaded onto a delivery conveyor system. In some embodiments, placement of a platter is accomplished automatically, such as with a robotic arm. In other embodiments, the empty platter is placed manually. The loading of a platter may be triggered by a notification that a new product has been received that requires images, or it may be independent of any such notification, such as at periodic intervals.

At 310, the representative object for the product is prepared for imaging. Preparation of an object may include various steps, depending on the nature of the product. In the case of a shoe, preparing the object may include removing one shoe from a shoe box, removing stuffing from the inside of the shoe, tying shoe laces, taking off labels, etc. The other shoe, stuffing, and other items may be replaced in the package. The object may be placed on a platter at the prep station. The platter may be an empty platter that has been previously placed on a delivery conveyor system. In certain embodiments, an empty platter may be placed manually at the prep station by an operator.

At 312, a product identifier, such as a bar code, for the product is scanned. The product identifier may be located on the product itself, or on or in the product package. In addition, an identifier (such as a bar code) on the platter on which the object is placed may be scanned. In a computer system, the scanned identifier for the platter may be associated with scanned identifier for the product.

At 314, the package for the product may be placed on a packaging conveyor. At 316, the package may be transported on the conveyor to a repackaging station. As previously described with respect to FIG. 4, transport of a package for an object to a repackaging station may be synchronized with transport of the object itself to the repackaging station.

At 318, the platter carrying the object may be delivered to a photographing machine. In some embodiments, delivering the object includes automatically transferring a platter carrying the object from a delivery conveyor to the photographing machine. At or near the entrance to the photographing machine, a platter identifier (e.g., bar code) on the platter may be scanned at 320. Based on the association made at 312 between the platter identifier and the product identifier, the platter identifier scanned at 320 may be used to determine which object is entering the photographing machine.

At 322, an algorithm for imaging the object may be retrieved (for example, from the imaging algorithms that were established at 290 and stored at 292). As discussed above, the algorithm may be based on the type or class for the object (dress shoe, jewelry, etc.). In one embodiment, from the bar code scanned at 312 from the object to be imaged, the imaging algorithm for the object type associated with the bar code may be selected. For example, if the bar code at 312 is associated with object type=boot/black/shiny, a seven-shot boot algorithm with appropriate lighting for a shiny black boot could be executed. At 324, the object may be imaged based on the imaging algorithm. In certain embodiments, data from sensors in the photographing machine, such as light levels, may be recorded.

At 326, the platter carrying the object is transported to a repackaging station. In some embodiments, transporting the object includes automatically transferring a platter for the object from photographing machine to a removal conveyor. At 328, the object may be removed from the platter and replaced in its package. As discussed above, the package conveyor may be delivered to the repackaging station at the same time as the object. At 329, the product including the repackaged object may be placed in inventory.

At 330, electronic data representing the images of the object may be received from the photographing machine, for example, at an image processing workstation. At 332, post-acquisition processing may be performed. Post-acquisition processing may include cropping, background removal, line removal, and straightening.

Automatic execution of a given algorithm using the same camera positions, lighting, and camera settings, may result in images that are consistent from object to object. For example, features in the background in the bottom view image for a boot may be very similar to features in the background in the bottom view image for the same boot acquired a month later using the same algorithm (or, in some cases, a different boot or shoe acquired using the same algorithm. As a result of the consistency in images between different photo shoots and/or different objects, cropping, background removal, line removal, and/or straightening may in some cases be performed automatically. For example, on a particular shot (e.g., a top view) in an imaging algorithm for given object type (e.g., a boot), it may be determined that a particular undesired feature (such as the edge of a rail or a shadow) appears in the same place on the resulting image every time the algorithm is executed. Information specifying the location of such an undesired feature may be stored in association with the imaging algorithm. This information may be retrieved during post-processing and used to automatically remove the undesired feature from the image. In certain embodiments, metadata associated with an acquired image, such as data relating to the object type (e.g., data relating to the physical characteristics of a product) or a particular photo shoot (such as light level data taken from sensors in the photographing machine), may be used in post-acquisition processing of an image.

At 334, quality assurance checks are performed on the images acquired for the object. At 336, the object may be posted for review by customers, such as on a website for making retail purchases. As noted above relative to FIGS. 3A-3G, automatic image acquisition using an automatically opposing background may result in images that are ready for use or display as is, without retouching. As a result, post-acquisition image processing such as described at 332 may, in certain embodiments, be eliminated or minimized (for example, post-acquisition image processing may be limited to auto-cropping of the images).

At 340, the platter that carried the object, now empty, may be removed from the platter removal conveyor. In some embodiments, the empty platter may be removed automatically, such as with a robotic arm. At 342, anti-static procedures may be performed on the platter. At 344, the platter is returned to the delivery conveyor, where the platter may be reused.

Figure 7A:
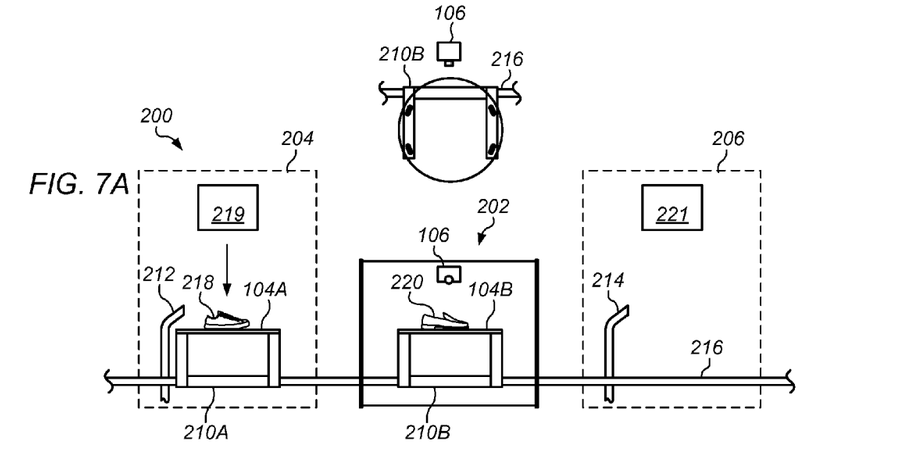
FIGS. 7A-7C are schematic diagrams illustrating an image acquisition system having dual rail-mounted platter drive systems.
Figure 7B:
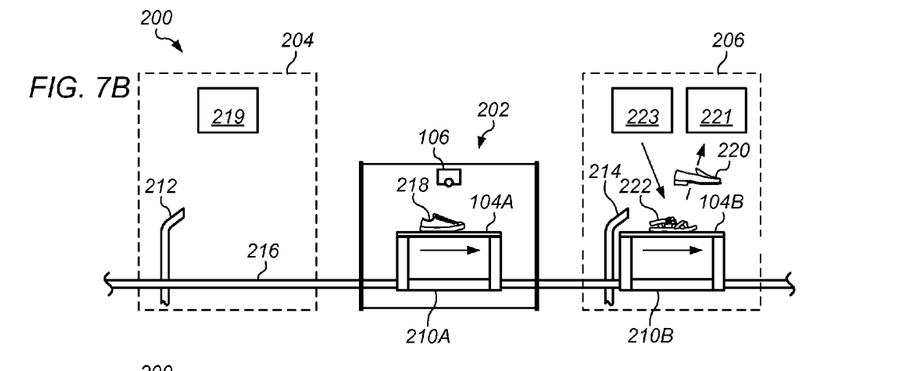
Figure 7C:
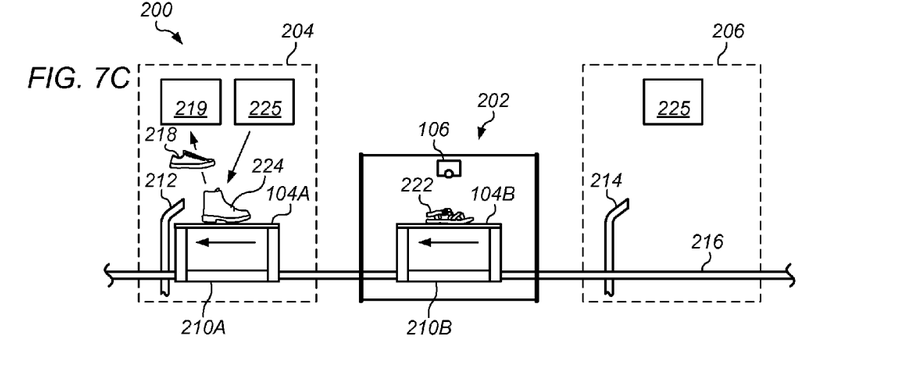

In some embodiments, two or more platters may be automatically positioned in a target zone of an image acquisition system in an alternating or reciprocating manner. In one embodiment, for example, as an object is imaged on one platter, another object may be loaded or unloaded from second platter, in an alternating, back-and-forth process. FIGS. 7A-7C are schematic diagrams illustrating an image acquisition system having dual rail-mounted platter drive systems. Image acquisition system 200 includes photographing machine 202, left imaging prep station 204, and right imaging prep station 206. Photographing machine 202 may have a camera mounted on a carrier in a "squirrel cage" arrangement, similar to that illustrated in FIG. 1. Left imaging prep station 204 includes scanner 212. Right imaging prep station 206 includes scanner 214.

Platter drive system 210A and platter drive system 210B are mounted on rail 216. Rail 216 may be a continuous rail that passes through photographing machine 202, left imaging prep station 204, and right imaging prep station 206. Rail 216 may pass through photographing machine 202 at a location such that rail 216 and platter drive systems 210A and 210B do not interfere with the movement of camera 106. For example, rail 216 may be located such that camera 106 can swing outside and below rail 216 to allow camera 106 to be positioned below the platter. Rail 216 may also be located so that the rail and platter drive systems do not appear in any shots needed for the object.

In FIG. 7A, platter drive system 210A is at left imaging prep station 204 and platter drive system 210B is in photographing machine 202. At left imaging prep station 204, shoe 218 may be removed from package 219 and placed on platter 104A. At the same time, photographing machine 202 may acquire images of shoe 220 on platter 104B.

In FIG. 7B, platter drive system 210A has been shifted into photographing machine 202 and platter drive system 210B has been shifted to right imaging prep station 206. Photographing machine 202 may now acquire images of shoe 218 on platter 104A. At the same time, at right imaging prep station 206, shoe 220, which has already been imaged (see FIG. 7A), may be removed from platter 104B and replaced in its package 221. Shoe 222 may be removed from package 223 and placed on platter 104B and prepared for imaging, thereby reloading platter 104B.

In FIG. 7C, platter drive system 210A has been shifted back to left imaging prep station 204 and platter drive system 210B has been shifted back into photographing machine 202. Photographing machine 202 may now acquire images of shoe 222 on platter 104B. At the same time, at left imaging prep station 204, shoe 218, which has already been imaged (see FIG. 7B), may be removed from platter 104A and replaced in its package 219. Shoe 224 may be removed from package 225, placed on platter 104A, and prepared for imaging, thereby reloading platter 104A. The alternating loading/imaging/unloading process described above relative to FIGS. 7A-7C may be continued with additional objects for as long as needed.

Figure 8A:
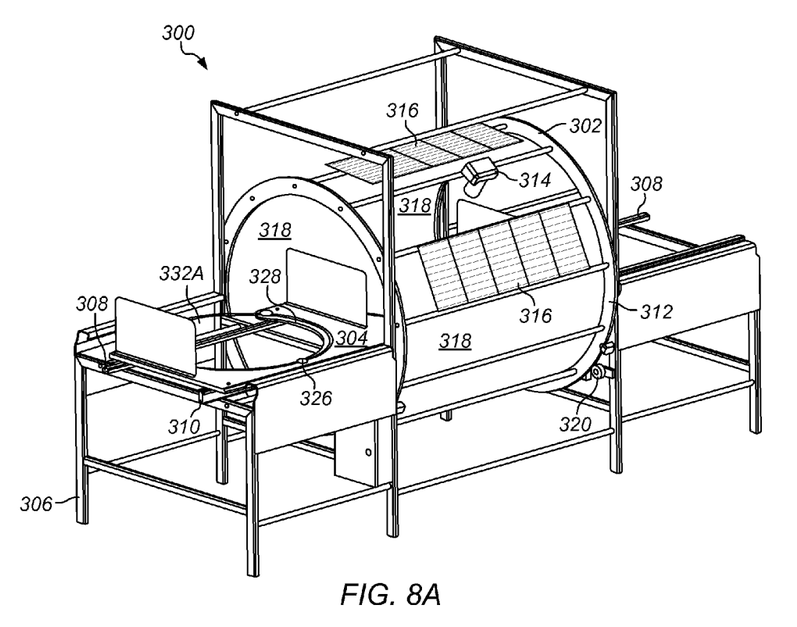
FIG. 8A illustrates an image acquisition system having a translating shuttle with two platter drive systems.

FIG. 8A illustrates an image acquisition system having a translating shuttle with two platter drive systems. Image acquisition system 300 includes photographing machine 302, shuttle 304, and frame 306. Rails 308 and 310 are provided on frame 306. Shuttle 304 may translate on rails 308 and 310. Photographing machine 302 includes carrier 312, camera 314, lights 316, and diffuser 318. Diffuser 318 may diffuse, scatter, and/or reflect light emitted from lights 316. Diffuser 318 may serve as a background panel for photographing machine 302. Rotation of carrier 312 on frame 306 may be carried out using drive wheel 320, which may be coupled to a drive system. Imaging operations may be carried out using a control system similar to that described above with respect to FIGS. 1 and 2. Carrier 312 may be rotated during imaging in a manner similar to that described above relative to FIGS. 3A-3G.

Figure 8B:
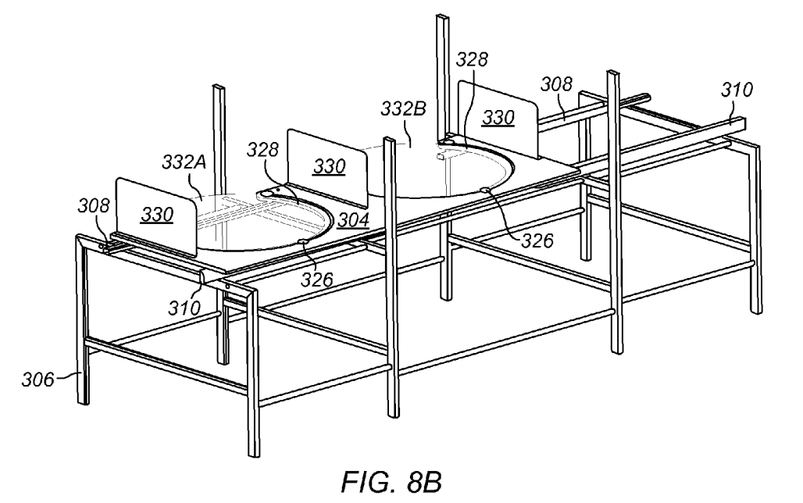
FIG. 8B illustrates a view of the imaging acquisition system shown in FIG. 8A in which portions of a photographing machine are removed for illustrative purposes.

FIG. 8B illustrates a view of the imaging acquisition system shown in FIG. 8A in which portions of photographing machine 302 and frame 306 are removed to better illustrate shuttle 304 and rails 308 and 310. Shuttle 304 includes platter drive systems 326, seats 328, and panels 330. Shuttle 304 carries platters 332A and 332B in seats 328. Platters 332A and 332B may be transparent. Platter drive systems 326 may spin platters 332A and 332B on shuttle 304. Image acquisition system 300 may be operated to alternately load objects onto platters 332A and 332B and capture images of the objects on the platters, in a manner similar to that described above with respect to FIGS. 7A-7C. Panels 330 may reflect light in photographing machine 302 during imaging. In one embodiment, panels 330 are white.

As show in FIG. 8B, seats 328 may be open on the side of shuttle 304 that is away from camera 314. In addition, as show in FIG. 8B, rail 308 may be split so that rail 308 does not appear in images captured using camera 314.

Figure 9A:
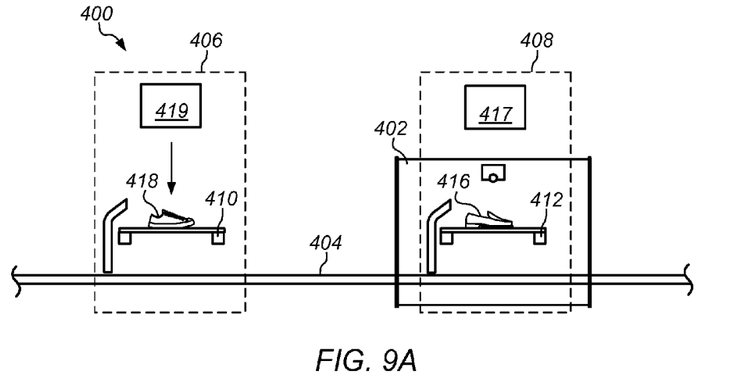
FIGS. 9A and 9B are schematic diagrams illustrating an embodiment of an image acquisition system having a rail-mounted, translating photographing machine.
Figure 9B:
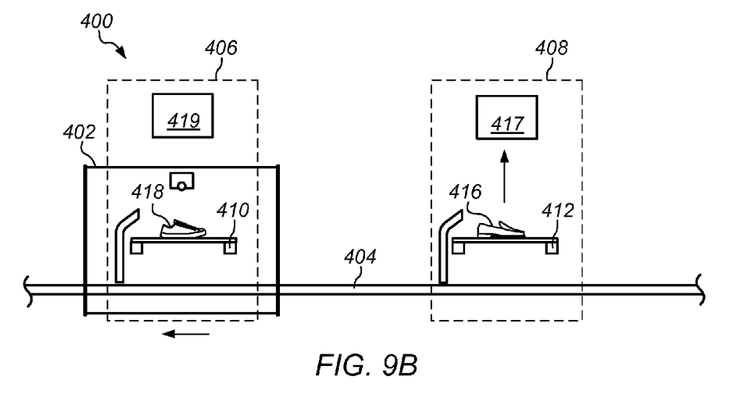

In some embodiments, a photographing machine, or a camera for the photographing machine, may movable between two or more objects and/or platters. FIGS. 9A and 9B are schematic diagrams illustrating an embodiment of an image acquisition system including a rail-mounted photographing machine. Image acquisition system 400 includes photographing machine 402, rail 404, left imaging station 406, and right imaging station 408. Left imaging station 406 includes left platter drive system 410. Right imaging station 408 includes right platter drive system 412.

Photographing machine 402 may have a camera mounted on a carrier in a "squirrel cage" arrangement, similar to that illustrated in FIG. 1. Photographing machine 402 may be mounted on rail 404. Photographing machine 402 may translate back and forth between left imaging station 406 and right imaging station 408 to alternately capture images of objects at the two stations. When photographing machine 402 is translated to right imaging station 408 (see FIG. 9A), photographing machine 402 may capture images of object 416 on right platter drive system 412. At the same time, left platter drive system 410 at left imaging station 406 may be loaded with object 418 from package 419. When photographing machine 402 is translated to left imaging station 406 (as shown in FIG. 9B), photographing machine 402 may capture images of object 418 on left platter drive system 410. At the same time, object 416 (which has already been imaged at right imaging station 408 can be unloaded (with or without the platter for the object) from right platter drive system 412 and replaced in package 417, as illustrated in FIG. 9B, and right imaging station 408 reloaded with another object and/or platter. The imaging/loading/reloading process may be continued between the two stations in an alternating, continuous manner.

In the embodiment shown in FIGS. 9A and 9B, each station has a dedicated platter drive system to turn platters during imaging. In other embodiments, however, a single platter drive system may be coupled to carrier and move back and forth with the photographing machine between two or more stations.

Although in the embodiments shown in FIGS. 7A-7C and 9A-9B, movement of platter drive system 210A, platter drive system 210B, and photographing machine 402 is accomplished using rail systems, in other embodiments, a conveyor belts, motorized carts, or other mechanisms may be used to move a platter, platter drive system, a photographing machine, or a camera carrier relative to other elements of a system.

Figure 10:
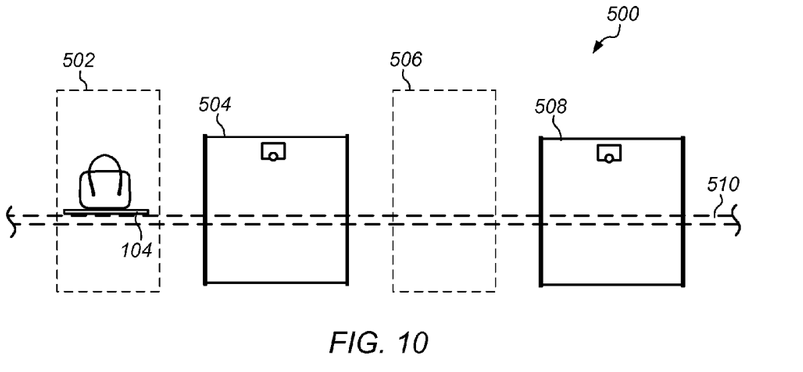
FIG. 10 is a schematic diagram illustrating an embodiment of an image acquisition system that includes two photographing machines.

In some embodiments, an object may pass sequentially through two or more photographing machines. FIG. 10 is a schematic diagram illustrating an embodiment of an image acquisition system that includes two photographing machines. Image acquisition system 500 includes first imaging prep station 502, first photographing machine 504, second imaging prep station 506, second photographing machine 508, and object transport system 510. Object transport system 510 may transport an object to be photographed sequentially through image acquisition system 500. The object may be transported on a carrier platter, such as described above with respect to FIGS. 1, 2, 4, and 5. Object transport system 510 may include one or more conveyors, platter transfer mechanisms, and platter drive mechanisms, such as those described herein.

At first imaging prep station 502, the object may be prepared for imaging in first photographing machine 504. At second imaging prep station 506, the object may be prepared for imaging of different views/portions of the object in second photographing machine 508. For example, first photographing machine 504 may operate a first camera to acquire images of the exterior of a purse. At second imaging prep station 506, the object may be prepared for imaging of different views/portions of the object in second photographing machine 508. For example, an operator may reposition and/or open the purse. Second photographing machine 508 may operate a second camera to acquire images of the interior of the purse.

In certain embodiments, a photographing machine may include two or more cameras. For example, a photographing machine may include one camera for taking images of an exterior of an object (such as the exterior of a purse) and a second camera for taking images of the interior of the object (such as the interior of the purse). Each of the cameras may have a different configuration. The two or more cameras may be arranged, for example, side-by-side, or on a rotating carousel. The photographing machine may move an active camera, an object carrier, or both, as needed to position and point the active camera at the object.

Although in the embodiments shown in FIGS. 1 and 2, the camera and background panel may be coupled in a fixed relationship to the carrier and to one another, carried elements may, in various embodiments, be coupled for movement relative to a carrier and/or to one another. For example, a camera may be pivotally coupled to a carrier. As another example, a background panel may be coupled to a carrier such that the background panel slides on a rail of the carrier. As still another example, a camera and a background panel may each be coupled on separate arms of a carrier, in which the two arms of the carrier are separately moved and controlled with respect to one another and/or with respect to a common base.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. An image acquisition system for acquiring images of an object from multiple positions, comprising:
   a carrier configured to move around an axis of the carrier about a target zone located apart from the carrier within the carrier's interior space;
   a transport mechanism configured to automatically convey objects sequentially into and out of the target zone along a direction of travel parallel to said axis of the carrier as the objects advance in sequence through the image acquisition system;
   a camera coupled to the carrier, via a direct or an indirect connection, so that as the carrier moves around said axis, the camera is configured to:
      move along with the carrier through multiple positions, relative to the target zone; and
      acquire images of an object, conveyed into the target zone on the transport mechanism, from the multiple positions, using light visible within the target zone; and
   a background coupled to the carrier, via a direct or an indirect connection, so that as the carrier moves around said axis, the background is configured to maintain a position opposite the camera, relative to the target zone.

2. The system of claim 1, wherein the image acquisition system is configured so that features of the transport mechanism do not appear in images of the object taken by the camera.

3. The system of claim 1, wherein the image acquisition system includes a carrier arm configured to position the camera and a separate background arm configured to position the background, wherein the carrier arm and the background arm are configured to be separately moved and controlled.

4. The system of claim 1, wherein the camera remains confined to a plane perpendicular to said axis of the carrier as the carrier rotates on said axis about the target zone.

5. The system of claim 1, wherein the image acquisition system is configured so that the camera remains at approximately a same distance from the target zone as the carrier rotates on said axis about the target zone.

6. The system of claim 1, wherein the image acquisition system is configured to control the light visible within the target zone to vary in intensity or in color or in both intensity and color.

7. The system of claim 1, wherein the background is flat, arcuate, curved, concave, convex, irregular, or a combination thereof.

8. The system of claim 1, wherein the background is shaped to match a shape of the carrier.

9. The system of claim 1, wherein the background extends in an arc around a portion of a circumference of the carrier.

10. The system of claim 1, wherein the background diffuses the light into the target zone.

11. The system of claim 1, wherein the background is translucent and backlit to diffuse light from background lights into the target zone.

12. The system of claim 1, wherein the image acquisition system is configured to control the background and the light visible within the target zone to produce a background image that remains relatively consistent from image to image in the images of the object taken by the camera from the multiple positions.

13. The system of claim 1, wherein the image acquisition system includes one or more platters which are separate from the carrier and are configured to support the objects while the objects are in the target zone.

14. The system of claim 13, wherein the image acquisition system includes a platter drive system configured to drive the platter supporting an object by rotating, translating, or otherwise moving the platter while the platter is within the target zone, independently of the transport mechanism.

15. The system of claim 14, wherein the image acquisition system includes a carrier drive system that rotates the carrier on said axis in synchronization with the platter drive system.

16. The system of claim 13, wherein the platter serves as a carrier for the object as the object moves through the image acquisition system.

17. The system of claim 16, wherein the transport mechanism includes a conveyor or rail to carry the platter and the platter drive system.

18. The system of claim 13, wherein the platter is transparent so that the camera can capture images through the platter.

19. A method for acquiring images of an object from multiple positions, wherein the method comprises:
   directing a transport mechanism to automatically convey objects sequentially into and out of a target zone located within an interior space of a carrier configured to rotate axially about the target zone, wherein the transport mechanism conveys the objects into and out of the target zone along the carrier's axis of rotation;
   while a given object of the sequence of objects is located in the target zone, controlling the carrier to rotate axially about the target zone such that:
      a camera coupled to the carrier, via a direct or an indirect connection, moves along with the carrier through multiple positions, relative to the target zone; and
      a background coupled to the carrier, via a direct or an indirect connection, maintains a position opposite the camera, relative to the target zone;
   when the camera is located at a given position of the multiple positions, signaling the camera to acquire an image of the given object from the given position, using light that is visible within the target zone; and
   storing the images of the given object taken by the camera.

20. The method of claim 19, wherein a control unit is programmed to perform said directing the transport mechanism, said controlling the carrier, said signaling the camera, and said storing.

* * * * *